3,198,009
MASS FLOWMETER

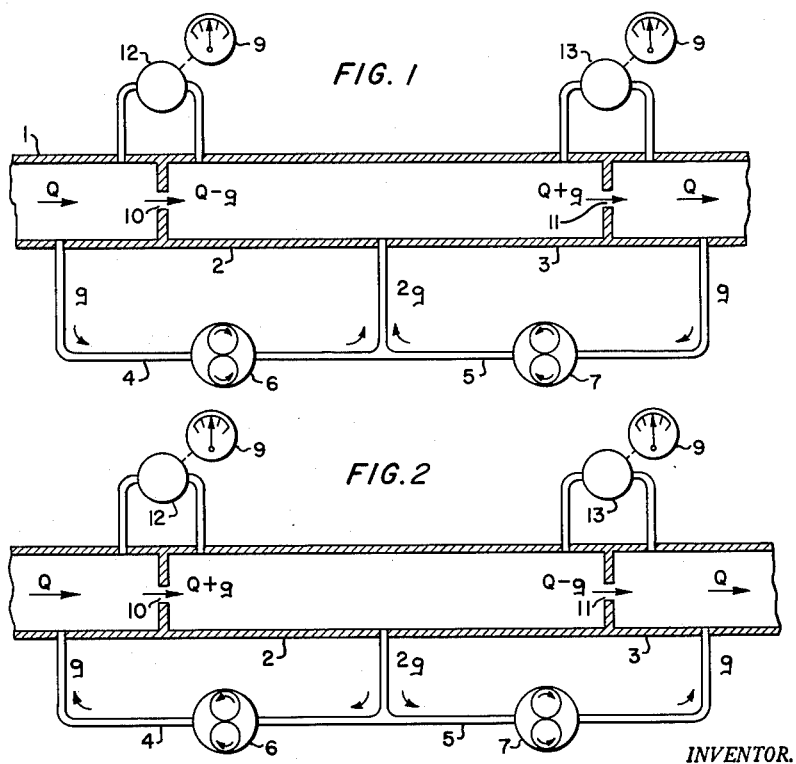

Bernard Fishman, New York, and Frederick Ryder, Lynbrook, N.Y., assignors, by mesne assignments, to Flotron Inc., a corporation of New Jersey
Original application July 22, 1958, Ser. No. 750,220, now Patent No. 3,015,233, dated Jan. 2, 1962. Divided and this application Dec. 26, 1962, Ser. No. 246,913
5 Claims. (Cl. 73—211)

This application is a division of the patent application filed July 22, 1958, Serial No. 750,220 in the name of Bernard Fishman and Frederick Ryder, and since issued on January 2, 1962, as U.S. Patent No. 3,015,233.

This invention relates to apparatus adapted to measure rate of flow of fluids and more particularly relates to flowmeters adapted to measure mass flow rate in a linear manner.

Flowmeters adapted to measure the rate of flow through a conduit can usually be classified into one of three types; namely, volumetric, pressure head differential and mass-rate.

In the volumetric flowmeter the flow of liquid causes a propeller or turbine to revolve with an angular velocity proportional to the volume of fluid passing through it. In other embodiments the flow causes rotation of a nutating disc, rotation of an oscillating piston, or reciprocation of plungers. Such volumetric flowmeters require a converter to give actual flow rate. In order to read out mass flow rate, it is necessary that a signal proportional to the density of the fluid be combined with the flowmeter readings.

Pressure head differential flowmeters measure flow rate by sensing the pressure differential across an orifice or at points of different diameter in a venturi, flow nozzle, pitot tube, or other such device. The pressure head or kinetic energy created by the fluid velocity is measured in this type of meter. Since there is a known relationship between pressure head and fluid velocity for each specific meter, the fluid velocity can be determined by the following formula:

$$V = C\sqrt{\frac{2g\Delta P}{S}}$$

Where:
$V$ = Velocity of fluid
$C$ = Metering element coefficient
$g$ = Gravity constant
$\Delta P$ = Pressure head differenetial
$S$ = Density of fluid Mass flow rate is equal to:

$$W = SAV = CA\sqrt{2gS\Delta_s P}$$

Where:

$W$ = Mass flow rate
$A$ = Area of the metering element cross section.

Therefore, using known pressure head differential flowmeters to obtain mass flow rate measurements also requires measurement of density and extraction of the square root of the read out. Further, the pressure head differential output signal by itself has a non-linear relationship to the flow rate and cannot be related to either the mass or volumetric flow rate except by including a fluid density factor.

Both the volumetric and pressure head differential flowmeters have the additional fault that they will not accurately measure flow rate when the flow is pulsating or transient. In the measurement of pulsating or transient flows, the accuracy of the volumetric type flowmeter is limited by the poor response characteristics of the known sensing elements. The pressure head differential type flowmeter will introduce errors in measuring transient or pulsating flow due to the non-linear flow to read out relationship.

There are two basic types of mass rate flowmeters; namely, angular momentum and recirculating type meters. In the former, angular momentum is imparted to the flowing fluid by means of a pump driven by a constant speed driving motor and the read out signal is obtained as a function of the motor torque. This type of mass rate flowmeter is expensive, tends to require a great deal of maintenance, does not provide direct linear read out proportional to mass flow rate and is not accurate when the flow rate is pulsating.

In the recirculation type of mass rate flowmeter, recirculation pumps or other such devices are used to obtain a recirculation of a constant volumetric flow in the meter. The meter is essentially a pressure differential type meter in which a constant volumetric flow is added or substracted from the fluid flow being measured. The subject invention is an improved flowmeter of this type.

It is an object of this invention to provide a flowmeter which uses two differential pressure transducers and indicators to obtain a liner indication of mass flow rate of fluids having different densities.

It is another object of this invention to provide such a flowmeter which acccurately measures transient or pulsating flow as well as steady flow.

It is another object of this invention to provide such a flowmeter which is inexpensive, simply constructed and requires a minimum of maintenance.

Other objects and a fuller understanding of the invention may be had by referring to the following description and claims taken in conjunction with the accompanying drawings in which:

FIGURE 1 is a schematic drawing of a flowmeter of the present invention with two orifices, two recirculating pumps and two $\Delta P$ meters or pressure head differential transducers;

FIGURE 2 is a schematic drawing similar to FIGURE 1 illustrating a different manner of recirculating flow.

In FIGURE 1, a flowmeter is shown schematically using two orifices 10, 11 of area $A_1$ and $A_2$ spaced along in the path of flow in the conduit 1 within sections 2, 3 respectively. Both areas are of like size and configuration. Two pressure head differential transducers 12, 13 are used to measure the pressure drops across each of these orifices. If the pumps 6, 7 are hooked up and pump in the same manner as described in connection with FIGURE 1 the flow equation for each orifice will be:

(1) $$Q_v = CA\sqrt{\frac{2g\Delta P}{S}}$$

where:

$Q_v$ = volumetric flow rate
$C$ = orifice coefficient
$A$ = area of the orifice
$S$ = density of fluid
$g$ = gravity constant
$\Delta P$ = pressure drop across the orifice The expression for the flow across orifices 10 and 11 will then be:

$$(2) \quad Q - q = C_{10} A_{10} \sqrt{\frac{2g \Delta P_{10}}{S}}$$

$$(3) \quad Q + q = C_{11} A_{11} \sqrt{\frac{2g \Delta P_{11}}{S}}$$

By squaring and subtracting:

$$(4) \quad 4Qq = C_{11}^2 A_{11}^2 \left(\frac{2g \Delta P_{11}}{S}\right) - C_{10}^2 A_{10}^2 \left(\frac{2g P_{10}}{S}\right)$$

and if:

$$C_{11} = C_{10} = C$$

and $$A_{11} = A_{10} = A$$

Then we can write Equation 4 as:

$$(5) \quad 4Qq = \frac{2gC^2 A^2}{S}[\Delta P_{11} - \Delta P_{10}]$$

further:

$$(6) \quad \Delta P_{11} - \Delta P_{10} = \frac{2SQq}{gC^2 A^2} = \frac{2q}{gC^2 A^2}(SQ)$$

if we let:

$$\frac{2q}{gC^2 A^2} = XK \text{ (constant) } SQ = W$$

then:

$$(7) \quad \Delta P_{11} - \Delta P_{10} = KW$$

where:

$$SQ = W$$

Again it should be noted that the direction of recirculation flows $q$ could be reversed, as shown in FIGURE 2, with the result that the greater pressure drop would occur across orifice 10 rather than orifice 11. Therefore the final mass flows versus differential pressure relationship would be as shown below:

$$(8) \quad \Delta P_{10} - \Delta P_{11} = KW$$

Although we have described our invention with a certain degree of particularity, it is understood that the present disclosure has been made only by way of example and that numerous changes in the details of construction and the combination and arrangements of parts may be resorted to without departing from the spirit and scope of the invention as hereinafter claimed.

We claim:
1. A mass flowmeter adapted to measure the mass flow rate of liquid passing therethrough comprising a conduit, means defining two orifices having like cross-sections smaller than the cross-section of said conduit spaced along the path of flow within the conduit and coaxial therewith, a means for measuring the differential in pressure head across each of said orifices and means connected to said conduit for pumping a portion of the conduit flow around each orifice.

2. The mass flowmeter of claim 1 wherein the means for measuring the differential in pressure head are differential pressure transducers.

3. A mass flowmeter adapted to measure the mass flow rate of liquid passing therethrough comprising a conduit, means defining two orifices having like cross-sections smaller than the cross-sections of said conduit spaced along the path of flow within the conduit and coaxial therewith, a differential pressure transducer connected to said conduit across each of said orifices and two like pumps, each pump having its input and output ends connected to said conduit on opposing sides of one of said orifices.

4. The mass flowmeter of claim 3 including a means for operating said pumps at a constant speed.

5. A mass flowmeter adapted to measure the mass flow rate of liquid passing therethrough comprising a conduit, means defining two orifices having like cross-sections smaller than the cross-section of said conduit spaced along the path of flow within the conduit and coaxial therewith, a means for measuring the differential in pressure head in said conduit bridging said orifices, and means connected to said conduit for pumping a portion of the conduit flow around each orifice.

References Cited by the Examiner

UNITED STATES PATENTS 2,660,886  12/53  Milmore _____ 73—194 X

RICHARD C. QUEISSER, *Primary Examiner.*
DAVID SCHONBERG, *Examiner.*

UNITED STATES PATENT OFFICE
CERTIFICATE OF CORRECTION

Patent No. 3,198,009                              August 3, 1965

Bernard Fishman et al.

It is hereby certified that error appears in the above numbered patent requiring correction and that the said Letters Patent should read as corrected below.

Column 1, line 50, for "differenetial" read -- differential --; lines 53 and 54, the formula should appear as shown below instead of as in the patent:

$$W = SAV = CA\sqrt{2\bar{g}S\Delta P}$$

column 2, line 29, for "liner" read -- linear --; column 3, lines 10 to 15, for that portion of the equation reading $$-C_{10}^{2}A_{10}^{2}\left(\frac{2gP_{10}}{S}\right) \quad\quad \text{read} \quad\quad -C_{10}^{2}A_{10}^{2}\left(\frac{2g\Delta P_{10}}{S}\right)$$

same column 3, lines 25 to 27, for that portion of the equation reading $$(SQ)^{W} \quad\quad\quad \text{read} \quad\quad\quad (SQ)$$

same column 3, line 30, the equation should appear as shown below instead of as in the patent:

$$\frac{2q}{gC^{2}A^{2}} = K(\text{constant})$$

Signed and sealed this 15th day of March 1966.

(SEAL)
Attest:

ERNEST W. SWIDER                      EDWARD J. BRENNER
Attesting Officer                  Commissioner of Patents